United States Patent [19]

Eberthson et al.

[11] Patent Number: 5,605,834
[45] Date of Patent: Feb. 25, 1997

[54] COMPOSTING DEVICE

[75] Inventors: Lars Eberthson; Rita Eberthson, 4:e Långgatan 26, S-413 27 Göteborg, both of Sweden

[73] Assignee: Rita Eberthson, Sweden

[21] Appl. No.: 428,152

[22] PCT Filed: Oct. 29, 1993

[86] PCT No.: PCT/SE93/00906

§ 371 Date: Jun. 14, 1995

§ 102(e) Date: Jun. 14, 1995

[87] PCT Pub. No.: WO94/10103

PCT Pub. Date: May 11, 1994

[30] Foreign Application Priority Data

Oct. 29, 1992 [SE] Sweden .................................. 9203194

[51] Int. Cl.⁶ .................................................. C12M 3/00
[52] U.S. Cl. ....................... 435/290.3; 435/290.4
[58] Field of Search .................. 435/290.1, 290.2, 435/290.3, 290.4

[56] References Cited

U.S. PATENT DOCUMENTS 3,245,759  4/1966  Eweson .
5,322,792  6/1994  Peguy ....................................... 435/311

FOREIGN PATENT DOCUMENTS 613004  1/1961  Canada .

Primary Examiner—David A. Redding
Attorney, Agent, or Firm—D. Peter Hochberg; Mark Kusner; Michael Jaffe

[57] ABSTRACT

A composting device including a drum rotatably arranged about an axis slightly inclined to the horizontal, and having a feeding opening for composting material at the higher situated side of the drum and a discharge opening for finish composted material at the lower side of the drum, the interior of the drum being subdivided into a number of consecutive chambers arranged in the longitudinal direction of the drum, with intermediate sieve screens, whereby the adjacent chambers of the drum are entirely separated from each other by the sieve screens, whereby each sieve screen has the same size of meshes over its entire surface, and where each sieve screen has smaller mesh size in relation to the nearest preceding sieve screen.

3 Claims, 1 Drawing Sheet

COMPOSTING DEVICE

BACKGROUND OF THE INVENTION

Composting is an excellent method of letting the nature take care of the degradation of organic waste, such as parts of plants, domestic waste and the like. Under different climatic conditions there are put different demands onto the structural design and shape of the composting plants, but it is a common positive thing for different plants, different temperatures and moisture contents, and for different material that is to be decomposed, if the material continuously is supplied with oxygen necessary for the degradation.

For this purpose it earlier has been suggested to design the composting device, as a drum rotatably arranged about a horizontal or slightly inclined axis and having a net covered outer side, which at the slow rotation (if the drum on one hand turns the material in the drum mechanically and on the other hand allows the oxygen of the air to reach the material to a big extent. Such a device is known e.g. from U.S. Pat. No. 3,966,415, but the disadvantage with this device is that the outside wall of the drum, which is provided with net meshes of uniform size, will spread the degraded material over a distance equal to the drum length, at the same time as different fractions of the degraded material will be mixed with each other. Furthermore with this device there is the risk that more coarse material, that lies closer to the drum wall, may prevent discharge of more degraded material situated closer to the centre of the drum.

From U.S. Pat. No. 3,245,759 is known a plant for fermentation of organic material, which works with forced air through-flow, and which consists of an elongated cylindric drum, rotatable about an axis being slightly inclined to the horizontal. At the infeed end of the drum is provided a sieve, against which material to be treated is advanced by a screw. After the sieve the interior of the drum is divided by a number of partition walls into a number of closed fermentation chambers, situated one after the other, and which partition walls each having one opening, which during a short part of a revolution of the drum transfers material from one chamber to the chamber situated nearest thereafter.

CA-B-613,004 describes a composting plant with a horizontally arranged rotatable drum, the interior of which is divided by sieve walls, each of which has a large central opening and a number of smaller meshes. All sieve walls are identical, i.e. they have the same mesh size, and this implies that no uniform size of particles is obtained at the discharge side of the plant, which is also further accentuated by the fact that larger non-mouldered pieces can pass to the next section through the large central openings of the sieve walls.

The purpose and most important features of the invention

The purpose of the invention is to provide a composting device, by means of which the entire compost mass is supplied with oxygen in a simple and efficient way without forced air supply, at the same time as all degradable material will be disintegrated into an essentially uniform fraction, which can be collected in a simple way, and which device furthermore must be reliable and comparatively cheap to obtain and to operate, and this has been achieved by means of the characteristics defined in the accompanying claims.

DESCRIPTION OF THE DRAWINGS

The invention will be further described herebelow with reference to an embodiment shown in the enclosed drawing.

DESCRIPTION OF PREFERRED EMBODIMENT

Figure 1:
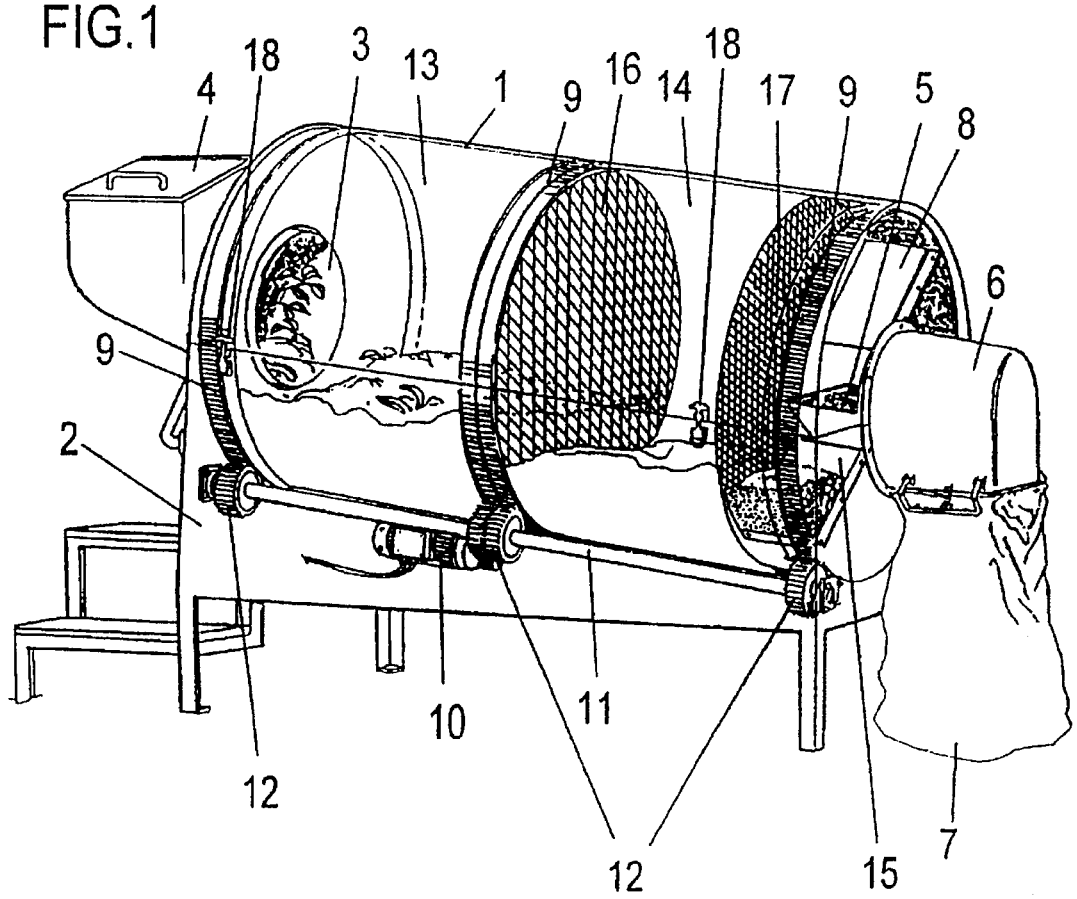
FIG. 1 shows in perspective a composting device according to the invention, whereby the outer wall of the drum is merely indicated in contours.

In FIG. 1 is shown, in perspective, a composting device according to the invention, which includes a cylindric drum 1, which is rotatably supported in a frame 2 about an axis slightly inclined against the horizontal. For the sake of clarity the envelope surface of the drum is shown transparent in the drawing figure, but it is preferably designed as a closed, untransparent cylindric wall, with or without insulating layer. In the upper gable of the drum is provided a centrally located feeding opening 3 to the outside of which is connected a feeding hopper 4 for material that shall be composted. In the lower gable of the drum is arranged, in a similar way, a centrally located discharge opening 5, to which is connected a discharge funnel 6, a sack 7 for collecting finish composted material being connected thereto in the embodiment shown. In connection to the discharge opening 5, the interior of the drum is provided with inclined fixed guiding walls 8, arranged to guide the compost material towards the central discharge opening 5 at rotation of, the drum.

In the embodiment shown the drum 1 has three circumferential, external gear rings 9, via which the drum is rotated by means of transmission from a driving motor 10 are by means of a gear drive 12 arranged on the axis 11 parallel with the drum.

The interior of the drum 1 is divided into a number of spaced apart cheers 13, 14, 15, whereby the dividing means consist of sieve screens 16, 17, of which the one 16, nearest to the feeding opening 3 has big meshes, whereas the mesh size in the following sieve screen 17 is smaller. In the embodiment shown there are only two sieve screens, which consequently subdivide the drum into three chambers, but it is understood that the device can be provided with further sieve screens, which subdivide the drum into further chambers, with gradually reduced mesh size in the sieve screens.

The envelope surface of the drum is preferably equipped with sections that could be open, represented in the figure by locking hooks 18.

When the material to be composted is introduced in the feeding hopper 4 it will reach the first chamber 13 through the feeding opening 3. The longitudinally slightly inclined drum is put in temporary rotation, e.g. 5–6 revolutions during a period of approximately 60 seconds once or some times in twentyfour hours. As the material in the first chamber 13 is degraded, it will, due to the inclination and temporary rotation of the drum, tend to travel through the first sieve screen 16, whereby however particles which are to big are retained in the first chamber 13 for further decomposition. Material, which in this manner is fed into the second chamber 14 via the first sieve screen 16, thereby has a certain maximum size. Smaller particles can travel directly through the second sieve screen, and after further decomposition in the second chamber the remaining material therein will be able to pass through the second, fine-meshed sieve screen 17, so that a rather uniform fraction will reach the third and last chamber 15 in the embodiment shown, from where the uniform finish composted material is discharged through the discharge opening 5 by means of the guiding walls 8, for thereafter being collected in an appropriate way, e.g. in sacks, in a wheelbarrow or the like.

Figure 2:
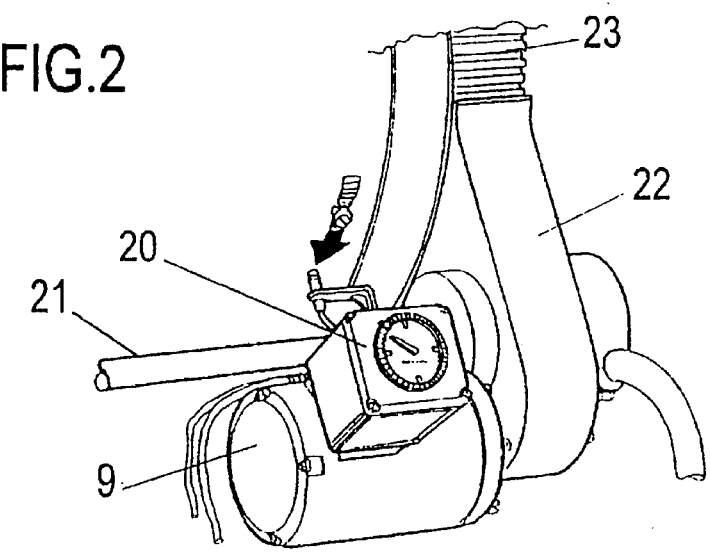
FIG. 2 is a detailed view in bigger scale of a solution for rotation of the drum.

In FIG. 2 is shown, in bigger scale, a section of a composting device according to the invention with a somewhat modified design of the driving means for the drum, whereby a driving motor 19 is provided with a timer 20 for turning on the motor at desired occasions. Here the motor is located at one of the drum gables but it is otherwise, in conformity with the embodiment according to FIG. 1, arranged to transfer its rotation via a common axis 21 to a number off gearwheels, in this case situated behind the housing 22, and cooperating with gear rings 23 along the circumference of the drum.

With a comparatively simple and inexpensive device in this manner is obtained very good oxygenization of the composting material, at the same time as there is a continuous advance of increasingly degraded material to the discharge side where the discharged material has e uniform size.

The invention is not limited to the embodiment shown in the drawing and described in connection thereto, but modifications and variants may occur within the scoop of the following claims. Even if the drum has been illustrated and described without any fixed inner shaft, it may also be proper to use an embodiment having a fixed centre shaft, about which the drum is brought to rotate, and which shaft supports firmly mounted brushes, arranged during rotation of the drum to brush against the sieve screens and to guide material through the sieve screens and to remove bigger particles that have been caught thereon.

We claim:

1. A composting device comprising a drum rotatably arranged about an axis lightly inclined to the horizontal, and having a feeding opening for composting material at the higher situated side of the drum and a discharge opening for the finished composted material at the lower side of the drum, the interior of the drum being subdivided into a number of consecutive chambers arranged in the longitudinal direction of the drum, with intermediate sieve screens wherein said adjacent chambers of the drum are entirely separated from each other by said sieve screens each sieve screen having the same size of mesh over its entire surface and a smaller mesh size in relation to the nearest preceding sieve screen.

2. A composting device according to claim 1, wherein said drum is equipped with rotatable means arranged to temporarily rotate the drum about its longitudinal axis.

3. A composting device according to claim 2, wherein said rotatable means include a motor controlled by a timer.

* * * * *